UNITED STATES PATENT OFFICE.

THADDEUS HYATT, OF PHILADELPHIA, PENNSYLVANIA, ASSIGNOR TO ELIZABETH A. LAKE.

IMPROVEMENT IN THE MANUFACTURE OF DRY CARAMEL.

Specification forming part of Letters Patent No. 53,249, dated March 13, 1866.

*To all whom it may concern:*

Be it known that I, THADDEUS HYATT, of Philadelphia, in the county of Philadelphia and State of Pennsylvania, have discovered a new Process or Manufacture, which I call "Dry Caramel," to distinguish it from the common sort or caramel of commerce, which is best known under the name of "burnt sugar," though mostly made from molasses.

It may be manufactured from any sort of sugar, sirup, or molasses, or from honey. Its chief use is for coloring brandies and for the cuisine, and, being of the same color as coffee, and more wholesome than chickory and other adulterating substances, it is used by some manufacturers to impart a rich color to their coffee which they do by roasting it with sugar. By this mode of combining the two, the caramel is formed upon the coffee in the form of a glazing; but as it soon grows soft and sticky on exposure to the air, the practice is to grind it immediately while hard. This plan is made necessary by the nature of caramel, which in the solid state cannot be powdered conveniently and in the liquid state must be used with the boiling water which serves to make the beverage. But as coffee soon loses flavor after the grains are broken, some better mode of serving the caramel is needed.

My improvement consists in furnishing it with a dry base of its own, which reduces it to a powdery condition and protects it from the air. It is then in proper shape for being mixed with coffee at any moment, and the coffee need not be ground until wanted for use.

The use of caramel with coffee has thus far been only as a coloring material, for the coffee has not been in a condition to require it. Like the perfumes of flowers, the aroma of coffee is in its oil. Coffee also contains caramel, and the beverage made from it is practically coffee caramel flavored by coffee-oil, each being the correlative and auxiliary of the other. To develop this oil and this caramel is hence the sole purpose of the roasting process, which is a sort of dry distillation.

The reason why coffee as commonly roasted is not in a condition to allow the caramel to do anything more than color it is because it is roasted dry or without any free oil, in which case there is but little more oil than the caramel of the coffee requires, and to add more caramel, under such circumstances, is merely to add color, and to let down the sharp high flavor or "gout acerbe" of the coffee; but when the whole of the oil is developed, it is so largely in excess of the wants of the coffee-caramel, that a pound of such oil-developed coffee requires a further addition of caramel to the extent of ten ounces at least, and it will bear one pound of dry caramel. When such a combination is made, the one pound of oil-developed coffee produces as much beverage as three pounds of the same coffee is capable of doing when roasted dry and used in its natural state, and the beverage from the former is superior to the latter. Under these circumstances the mode of preparing caramel is a matter of great importance, and my invention of a dry or absorbent base for it renders its universal use possible.

My invention, as already stated, consists in putting the caramel into a condition of dry powder, so that it cannot be affected by the air. This may be done in either of two ways—first, by glazing with caramel a part of the material of which this base is formed, and then mixing this with the unglazed portion; or, secondly, by combining the caramel directly with the whole of the base by absorption. This latter may also be effected in either of two ways—first, by using liquid-caramel; secondly, by combining the sweet material directly with the dry base and roasting the two together. I prefer the last method, because less difficult, more certain, and producing superior caramel.

The following is my method of procedure: With bran for a base I take five pounds of molasses to ten pounds of bran, dissolving the molasses in hot water sufficient to thoroughly soak the bran, which I then dry evenly. The bran thus saturated with sweet I place in a coffee-roaster and roast to a chocolate color, when it is taken out and cooled, and is fit for use. I also make dry caramel from bread by first drying the bread and reducing it to a coarse powder, when I treat it precisely as I have described my method of treating bran; but when I use flour as the absorbent base I make it into bread, using molasses in the same proportion as with bran, and mixing it into the dough. When the molasses is thus fully in corporated with the flour, I bake the bread in the ordinary way. Afterward I slice and dry it, and then reduce it to a coarse powder. This powder I put into a coffee-roaster and roast precisely as I have already described the bran.

Sugar-cane and sorghum-cane, or any equivalent of these simple sweet-producers, I regard as equivalents of the dry-base materials above described, and capable of being substituted for them. Even after these sweet canes are expressed, and when in the condition of "bagasse," they may be roasted so as to produce good dry caramel, as a certain amount of sweet always remains, even after the juice is expressed. But dry caramel must not be confounded with roasted beets, carrots, chickory, sweet pear, and other like saccharine substances from which coffee substitutes are commonly selected, for these vegetable substances when roasted produce, like coffee, not only caramel, but aromatic oil, and therefore each yields a beverage similar but inferior to coffee, the beverage of each one being its peculiar caramel flavored by its own peculiar oil, and hence none of them containing simple pure caramel. Of course such substances cannot combine with coffee-oil to produce actual coffee, as pure caramel does, and hence they are adulterating substances.

But although I have thus given prominence to dry caramel as an analogue of one of the coffee elements, I do not wish to be understood as limiting its application to this use, for it is applicable wherever ordinary caramel is employed.

Having thus fully made known the nature of caramel and its uses, the character of sugar-roasted coffee, the nature of oleaginous dry caramels, and the nature and modes of preparing the dry caramels of my invention, and their equivalents, without limiting myself to the precise things, or to the precise proportions herein specified, but giving them only as practical illustrations of the principle they represent, what I claim as my invention, and desire to secure by Letters Patent as a new manufacture, is—

Dry caramel, substantially as and for the purposes herein described.

THADDEUS HYATT.

Witnesses:
A. W. SCHAVIT,
L. G. HARVEY.